W. R. DUNKEL.
STARTING DEVICE FOR INTERNAL COMBUSTION ENGINES.
APPLICATION FILED NOV. 26, 1909.

980,502.

Patented Jan. 3, 1911.

Inventor
Wilber R. Dunkel.

Witnesses

By C. A. Snow & Co.
Attorneys

UNITED STATES PATENT OFFICE.

WILBER R. DUNKEL, OF PANA, ILLINOIS, ASSIGNOR OF ONE-HALF TO CARTER ROLAND SCROGGIN, OF HARRISTOWN, ILLINOIS.

STARTING DEVICE FOR INTERNAL-COMBUSTION ENGINES.

980,502.

Specification of Letters Patent. Patented Jan. 3, 1911.

Application filed November 26, 1909. Serial No. 529,981.

*To all whom it may concern:*

Be it known that I, WILBER R. DUNKEL, a citizen of the United States, residing at Pana, in the county of Christian and State of Illinois, have invented a new and useful Starting Device for Internal-Combustion Engines, of which the following is a specification.

This invention has for its object to provide a simple and efficient starting device for internal combustion engines, in which the crank shaft of the engine carries an independently rotatable member which is operatively connected by means of a flexible band to a lever, together with a clutch mechanism for coupling said member to the crank shaft when the member is rotated in one direction by the lever and flexible band.

The invention also has for its object to provide a mechanism for restoring the parts to their normal positions after the engine has been started.

Figure 1:
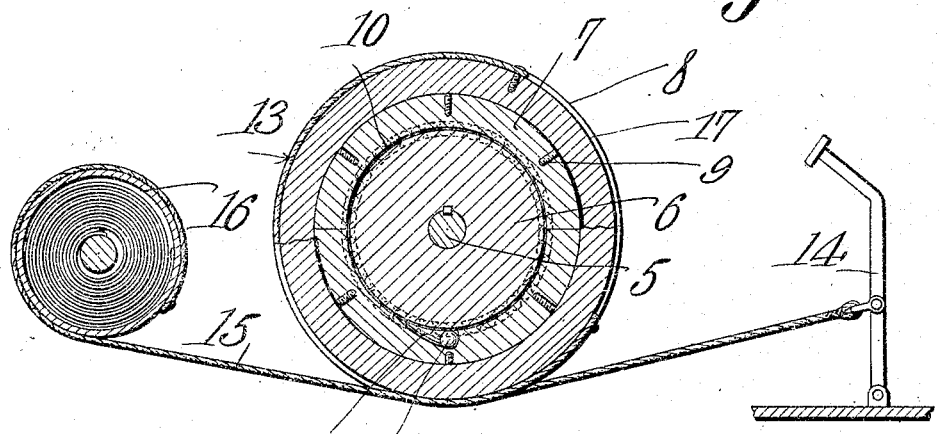
Figure 2:
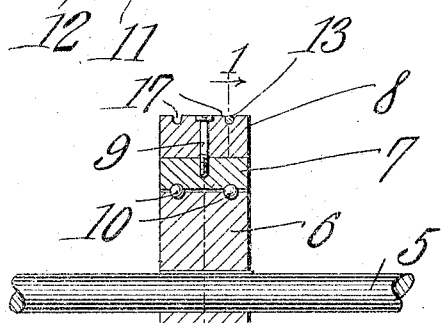

With these objects in view, the invention consists in the novel construction and arrangement of the parts to be hereinafter described and claimed, reference being had to the drawing hereto annexed, in which, Figure 1 is an elevation of the device, partly in section, the section being taken on the line 1—1 of Fig. 2. Fig. 2 is a vertical section on the line 2—2 of Fig. 1.

In the drawing, 5 denotes the crank shaft of the engine to which the invention is applied. On this shaft is keyed or otherwise made fast, a disk 6 which is encircled by a pair of concentric rings 7 and 8, said rings being fastened together by bolts 9, or other suitable means. The ring 7, which is the inner one, is loose on the disk so as to be free to rotate thereon, and the contiguous surfaces of said ring and disk are formed with ball races to receive anti-friction balls 10. The ring 7 is in two sections so that the parts may be assembled.

A clutch mechanism is provided for locking the ring 7 to the disk 6 when said ring is rotated in one direction. This clutch is a pawl and ratchet mechanism comprising a ball 11 seating in a pocket 12 made in the inner periphery of the ring 7. The pocket has an inclined wall so that when the ring is rotated in one direction, the ball 11 is jammed between said wall and the periphery of the disk 6, thereby coupling the parts. Upon rotating the ring in the opposite direction, the ball is forced back into the pocket thereby disconnecting the ring and disk. These parts constitute a well known pawl and ratchet mechanism, and if desired some other mechanism which accomplishes the same result may be substituted therefor.

The rotation of the ring 7 is effected by a band, cable or other flexible element 13, which is fastened at one end of the periphery of the ring 8 and is passed partly around the same, and then carried to, and connected at its other end to a foot pedal or other operating device 14. To the periphery of the ring 8 is also fastened one end of a flexible band 15, passing partly around the same, in the opposite direction from the band 13 and connected at its other end to a spring roller 16 for restoring the parts to their normal position. The ring 8 is of sufficient width so that the bands 13 and 15 may pass each other without interference, and in the periphery of the rings are grooves 17 in which the bands seat, whereby they are prevented from slipping off sidewise.

The operation of the device will be obvious from the foregoing description, but it may be summarized as follows: Upon swinging the foot pedal 14 forwardly, the rings 7 and 8 through the band 13 are rotated whereupon they are locked on the disk 6 by the pawl and ratchet mechanism, and as said disk is made fast to the crank shaft 5 of the engine, said shaft is rotated. The rotary movement of the rings 7 and 8, just described, also unwinds the band 15 from the spring roller 16, so that when the foot pedal 14 is released, said band is rewound on the spring roller, and the parts are thus restored to their normal position.

The device herein described is simple in construction and highly efficient in operation. It is designed primarily for automobiles, so that the engine may be started without the driver dismounting.

What is claimed is:—

In a starting device for an internal combustion engine, the combination with the crank shaft of the engine; of a disk made fast on the shaft, a ring loosely encircling the periphery of the disk, the outer periphery of said ring having spaced circumferential grooves, a clutch mechanism between the disk and the ring, flexible bands secured at one of their ends in the respective grooves, and wound around the ring in said grooves in opposite directions, and extending from the ring in opposite directions, an operating device connected to the other end of one of said bands, and a rewinding device to which the other end of the other band is connected.

In testimony that I claim the foregoing as my own, I have hereto affixed my signature in the presence of two witnesses.

WILBER R. DUNKEL.

Witnesses:
C. R. SCROGGIN,
M. P. COWEN.